United States Patent [19]

Kwak

[11] Patent Number: 5,291,466
[45] Date of Patent: Mar. 1, 1994

[54] AUTOMATIC CONTROL SYSTEM FOR A TRACKING SERVO UNBALANCE OF OPTICAL DISK PLAYER

[75] Inventor: Kook Y. Kwak, Kyungki-Do, Rep. of Korea

[73] Assignee: Goldstar Co., Ltd., Seoul, Rep. of Korea

[21] Appl. No.: 945,587

[22] Filed: Sep. 16, 1992

Related U.S. Application Data

[63] Continuation of Ser. No. 496,764, Mar. 21, 1990, abandoned.

[30] Foreign Application Priority Data

Mar. 22, 1989 [KR] Rep. of Korea ................. 3620/1989

[51] Int. Cl.⁵ .............................................. G11B 7/09
[52] U.S. Cl. .................................. 369/44.35; 369/32; 369/44.36
[58] Field of Search ............... 369/44.35, 44.36, 44.11, 369/44.29, 44.27, 44.31, 32, 33

[56] References Cited

U.S. PATENT DOCUMENTS

| 4,539,665 | 9/1985 | Iso et al. | 369/44.35 |
| 4,614,863 | 9/1986 | Sato | 369/44.36 |

FOREIGN PATENT DOCUMENTS

| 61-22442 | 1/1986 | Japan | 369/44.35 |
| 61-80530 | 4/1986 | Japan | 369/44.29 |
| 63-271730 | 11/1988 | Japan | 369/44.35 |

*Primary Examiner*—Tommy P. Chin
*Assistant Examiner*—Khoi Truong

[57] ABSTRACT

An automatic control system for tracking servo unbalance of optical disc player, which comprises first and second variable gain amplifiers, first and second photodetectors, a differential amplifier having resistors and capacitor, a direct current detector, a digital storing unit having an A/D/ converter, a ROM, a D/A converter, and an analog switch whereby the tracking servo unbalance is automatically eliminated upon manufacturing a CD player as well as the direct current detector and digital storing unit can be integrated so that cost is down and improvement of reliability is obtained.

3 Claims, 4 Drawing Sheets

AUTOMATIC CONTROL SYSTEM FOR A TRACKING SERVO UNBALANCE OF OPTICAL DISK PLAYER

This application is a continuation of application Ser. No. 07/496,764 filed on Mar. 21, 1990, now abandoned.

BACKGROUND OF THE INVENTION

The present invention relates to an optical disc player, and particularly, to an automatic control system for a tracking servo unbalance of optical disc player which determines automatically a value for making a tracking servo unbalance zero and storing this value digitally thereby eliminating tracking unbalance in an usual playback operation.

General in a compact disc, a signal is recorded on a track arranged helically in a direction from an inner side toward an outer side, of which distance between adjacent tracks; i.e., track pitch of a high density, is about 1.6 μm.

Compact disc player (CDP) irradiates with a laser beam from a pick-up device to a disc by focusing thereto and converting the quantity of the light reflected therefrom into an electric signal, thereby reading the signal. It is required to control the position of the laser beam to be incident on the track of turning disc.

On the other hand, a motor for turning a compact disc causes a phenomenon that moves the track inwardly and outwardly at the time of turning and therefore, the pick-up follows this and a device controls to be positioned on a proper track which is called a tracking servo. A servo error signal for informing how much deviation from an optimum state occurred is required for all servos which the compact disc player applies various optical methods to produce, however a typical method of producing the tracking servo error is known as a three-beam system.

FIG. 1 is a diagram for illustrating a principle on a three-beam system of a conventional optical disc player. As shown in FIG. 1, laser beam from a light source is divided into a number of beams by utilizing a grating which is within the interior of pick-up, and thereafter a major beam M having an intensity of greatest light quantity is positioned on a track CH0 recorded with desired signal, and sub-beams E and F provided at both sides of major beam M are positioned so as only one part of it is superposed on the track CH0.

At this moment, the beams M, E and F reflected from the disc, as shown in FIG. 2, reach the photodetectors 1-3, and a current corresponding to the light intensity is produced for each beam. The currents produced from the said photodetectors 1 and 3 are respectively applied to a variable resistor VR1, a resistor R1 and inverse terminals of operational amplifiers OP1 and OP2, thereby being converted to voltages of magnitude proportional to those currents respectively. The variable resistor VR1 is used for adjusting the disproportion of current conversion of the photodetector 1 according to the arranging error of optical parts and the like, and the outputs of the operational amplifiers OP1 and OP2 are differentially amplified through an operational amplifier OP3 whereby being used as tracking serve error signal.

On the other hand, since the sub-beams E and F are partly irradiated onto the track CH0, the interference effect from the signals decreases the reflected light quantity. Assuming that the voltages converted by the operational amplifiers OP1 and OP2 are values of $V_{EO}$ and $V_{FO}$, when the laser beams E, M and F are moved toward the direction A whereby being out of the track CH0 in this state, the beam E covers more of into the track CH0 and accordingly, the reflected light quantity is further decreased by the interference and dispersion of the signal whereby the produced current according to the photodetoctor 1 is decreased and converted into negative(−) sensitivity of voltage through the operational amplifier OP1, and therefore as shown in FIG. 3A, the magnitude is increased toward the arrow.

Simultaneously with this, the coverage of the beam F gets with respect to the track CH0 is decreased whereby the effect of the reflected light quantity according to the signal is reduced, and therefore the magnitude of voltage $V_{FO}$ converted into negative (−) component by the operational amplifier OP2 is decreased toward the arrow as shown in FIG. 3B. At this moment the tracking servo error of output by the operational amplifier OP3 is decreased toward the arrow ①, as shown in FIG. 3C.

When the beams E, M and F are further deviated toward A, the beam F covers the adjacent track CH1 and since the beam E gets no longer covers the track CH0, each reflected light quantity and conversion current and voltage accordingly is reversed with above-described case and therefore, the output tracking servo error is increased toward arrow ②, as shown in FIG. 3C. When the laser beam is further out of position and approaches the track CH1 closer than the track CH0, the coverage of the beam F with respect to the track CH1, is decreased and since the beam E covers the track CH1, the output tracking servo error is decreased toward arrow ③ as shown in FIG. 3C and finally arrives directly on the track CH1. That is, every time covering one track and covering the next track, the tracking servo error cycles one period of a sine wave, as shown in FIG. 3C.

The voltages $V_n$ and $V_p$ as shown in FIG. 3C affect the control power of the tracking servo, and the greater this magnitude, the stronger the control power is but if the voltages $V_{EO}$ and $V_{FO}$ are not the same by the optical parts or the photodetectors 1 and 3 and the like, the magnitudes of voltages $V_p$ and $V_n$ becomes unequal whereby an unbalance is produced in the control of the tracking servo.

Such unbalanced condition affects the stability of tracking servo, and particularly, when a factor of unstability occurs due to the external disturbance, it exerts a bad influence on the stability of the tracking servo and this is generally called an offset or an unbalance of tracking servo. In order to eliminate such unbalance, a variable resistor VR1 for determining the voltages $V_{EO}$ and $V_{FO}$, the conversion sensitivity of the operational amplifiers OP1 and OP2, is adjusted and thereby controlled at the product adjusting process.

Consequently, in the tracking error adjustment process according to the three-beam system of conventional optical disc player, since the manual adjustment process is required in the production process, there have been disadvantages that the system is weak in viewpoint of productivity and cost, and that the required value of the variable resistor fluctuates according to the external vibration or temperature and the like.

SUMMARY OF THE INVENTION

Therefore, it is an object of the present invention to provide an automatic control system for a tracking servo unbalance of optical disc player capable of detecting the unbalance of servo, thereby automatically eliminating the unbalance.

Such object of the present invention is accomplished by converting the output current of first and second photodetectors to voltage through first and second variable gain amplifiers, detecting the tracking servo error by differentially amplifying the output voltage of the first and second variable gain amplifiers with a differential amplifier, converting this tracking servo error into direct current voltage, applying this converted direct current voltage as a control voltage of the first variable gain amplifier for a predetermined time period, thereafter, converting the converted direct current voltage into digital signal, storing the digital signal and converting the stored digital signal into an analog signal and thereafter applying it as a control voltage of the first variable gain amplifier.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 4:
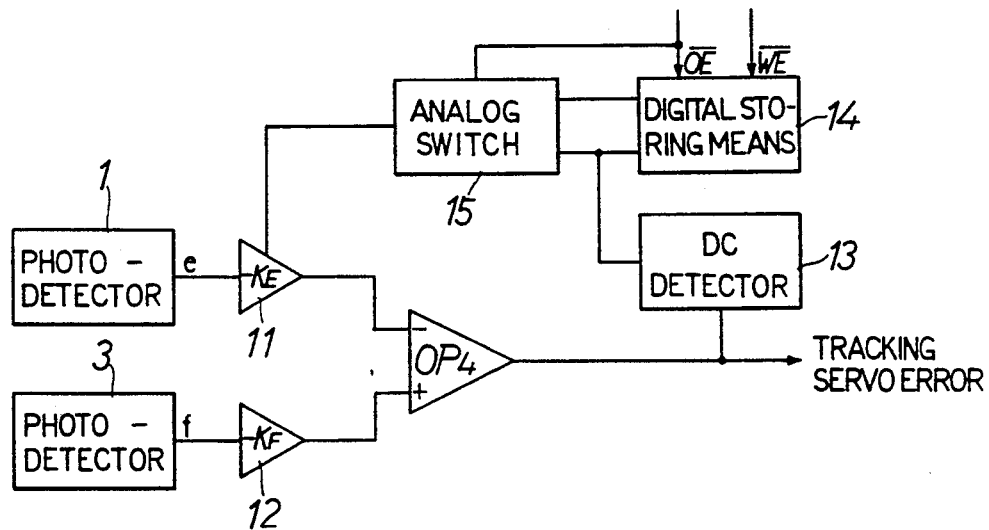
FIG. 4 is a block diagram of an automatic control system for tracking servo unbalance of optical disc player of a preferred embodiment of the present invention.

Referring now in detail to the drawings for the purpose of illustrating preferred embodiments of the present invention, the automatic control system for a tracking servo unbalance of optical disc player of the present invention as shown in FIG. 4, which comprises first and second variable gain amplifiers 11 and 12 for converting the output of first and second photodetectors 1 and 3 with gain rates $-KE$ and $-KF$; differential amplifier OP4 for differentially amplifying the output voltage of these first and second variable gain amplifiers 11 and 12 thereby outputting a tracking servo error; direct current detector 13 for detecting the direct current component of tracking servo error being as the output signal of this differential amplifier OP4; digital storing means for storing the output signal of the direct current detector 13 as a digital signal; in response to a using write enable signal $\overline{WE}$ being of external control signal, and outputting the stored digital signal which is converted into an analog signal in response to an output enable signal $\overline{OE}$ being of external control signal; and analog switch 15 for selecting one of output signals of the digital storing means 14 and direct current detector 13 thereby applying it as a gain control voltage of the first variable gain amplifier 11.

The automatic control system of the present invention operates as follows:

The intensity of the light reflected from disc is detected as a current at first and second photodetectors 1 and 3, the output current of the first and second photodetectors 1 and 3 is converted to voltage by first and second variable gain amplifiers 11 and 12 having respective gain rates $-KE$ and $-KF$. This voltage is differentially amplified at a differential amplifier OP4 having a gain rate K where the output is utilized as a tracking servo error.

Figure 1:
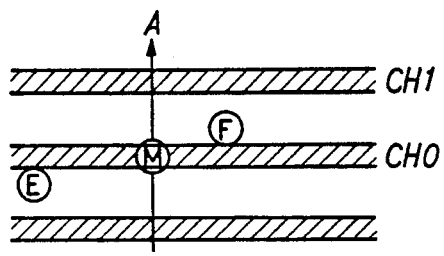
FIG. 1 is a diagram for illustrating a principle of the three-beam system of a conventional optical disc player.
Figure 2:
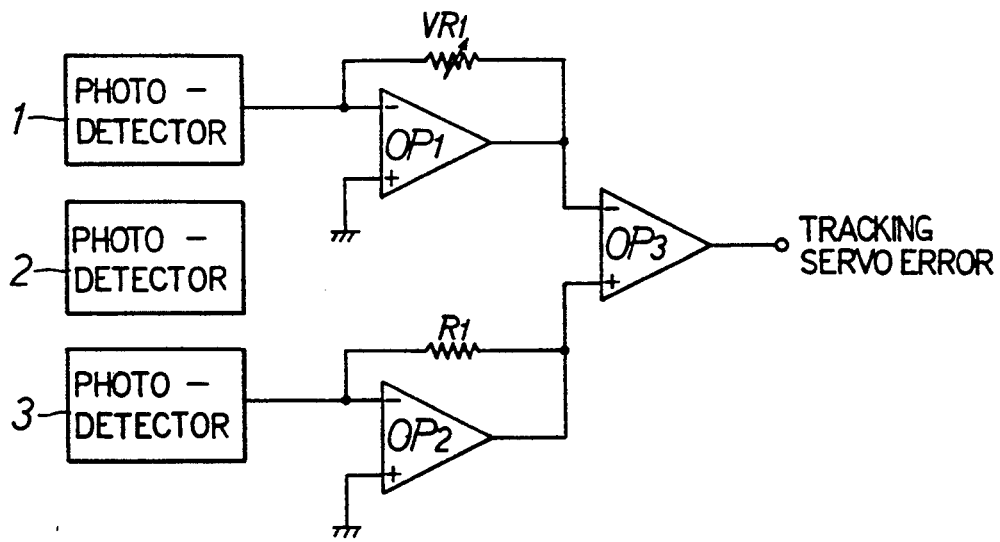
FIG. 2 is a circuit diagram of tracking error amplifier of the conventional optical disc player.
Figure 3A:
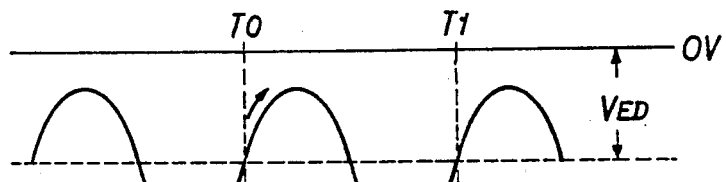
FIGS. 3A to 3C are waveform charts of each portion of FIG. 2.
Figure 3B:
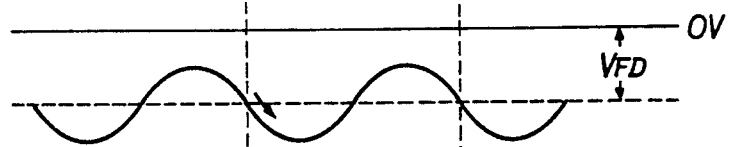
Figure 3C:
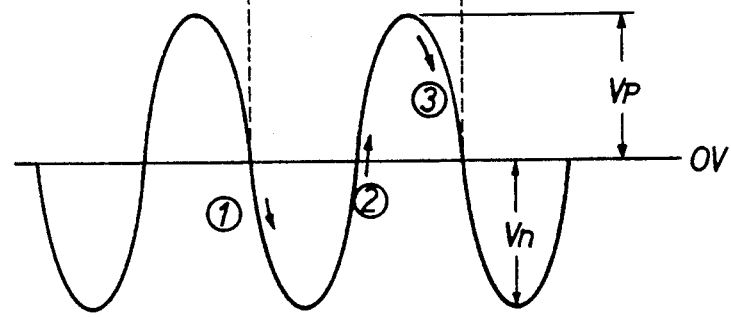

As shown in FIG. 1, when it is assumed that the voltages detected at first and second photodetectors 1 and 3 are e and f in case where the laser beams E and F are positioned on the tracks CH0, CH1 respectively, the tracking servo error produced from output side of differential amplifier OP4 becomes as $K(K_E \cdot e - K_F f) = K_T \cdot (me - f)$, but $K_T = KK_F$, $m = K_E/K_F$, wherein as ideal, the output currents e and f of first and second photodetectors 1 and 3 become as $e = f$ if it is adjusted as $m = 1$, that is, $K_E = K_F$ the tracking unbalance is not present, but practically the output currents e and f of first and second photodetectors 1 and 3 are not same, and therefore, it should be made as $me - f = 0$ by controlling m which is the ratio of $K_E$ with respect to $K_F$.

By the way, the difference of the outputs e and f of first and second photodetectors 1 and 3 is produced as sine waves at the time of crossing the track of laser beam, thereby being produced as direct current voltage of tracking servo error, in which voltage is detected by the direct current detector 13 and then being negatively fedback to first variable gain amplifier 11 through the analog switch 15 thus controlling the gain rate $K_E$.

That is, when the direct current of the direct current detector 13 becomes positive(+), the tracking servo error becomes $me < f$, accordingly decreasing the gain rate $K_E$ of first variable gain amplifier 11 becoming $K_F/K_E$ and thereby controlling so as to decrease m. When the direct current of the direct current detector 13 becomes negative(−), increasing the gain rate $K_E$ whereby rendering to become balanced state in a state that the direct current voltage being of tracking servo error has become as "0".

The digital storing means 14 is controlled by a write enable signal $\overline{WE}$ which is an external control signal to store in digital the feedback value for eliminating the tracking servo unbalance. When the write enable signal $\overline{WE}$ is in an active state, i.e., low potential state, the feedback value being outputted by the direct current detector 13 is converted into a digital signal and stored in the digital storing means 14. When the output enable signal $\overline{OE}$ is in an active state, i.e., high potential state, the digital signal is read out from the digital storing means 14 and outputted as an analog signal.

When it is assumed that the variable gain sensitivity according to the external signal of first variable gain amplifier 11 is KV, the analog switch 15 receives the output of direct current detector 13 and output of the digital storing means 14 and feeds back the variable gain KV to the variable gain amplifier 11 according to the output enable signal $\overline{OE}$. When the output enable signal $\overline{OE}$ becomes active, the output of digital storing means 14 is provided and, when it is not active, the output of direct current detector 13 is fedback to first variable gain amplifier 11 through the analog switch 15 thereby automatically controlling the tracking servo unbalance.

Figure 5:
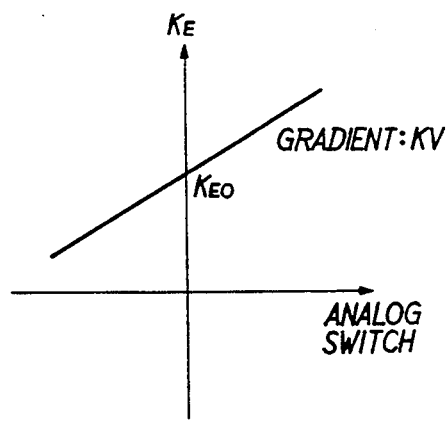
FIG. 5 is a graph of responsive characteristic for illustrating the relation between the control signal and the gain of variable gain amplifier of the present invention.

FIG. 5 is a graph for illustrating the response characteristic between the gain control signal and the gain of first variable gain amplifier 11 of the present invention. As shown in FIG. 5, in case where the variable gain sensitivity KV according to the external signal is not present, i.e., the negative feedback is not fed, the first variable gain amplifier 11 starts to have the gain rate $K_{EO}$, and sets the gain rates $K_{EO}$ and $K_{FO}$ of first and second variable gain amplifiers 11 and 12 to be same whereby rendering the tracking servo unbalance not to be produced, and in case where the tracking servo unbalance is produced, the variable gain sensitivity KV according to the external signal becomes as the gradient of response characteristic.

Figure 6:
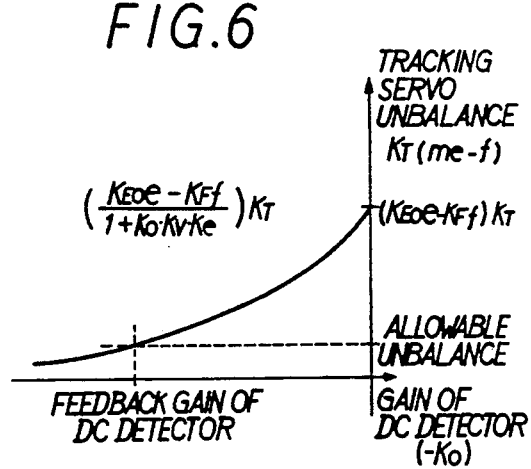
FIG. 6 is a graph of responsive characteristic for illustrating the relation between the tracking servo unbalance and the gain of direct current detector of the present invention.

FIG. 6 is a graph for illustrating the response characteristic between the tracking servo unbalance and the gain of the direct current detector of the present invention. As shown in FIG. 6, in case when the analog switch 15 provides the output of direct current detector 13 to the first variable gain amplifier 11 whereby the negative feedback control for the tracking servo unbalance is fed, the relation of the tracking servo unbalance me−f with respect to the gain −KO of the direct current detector 13 is illustrated, in which the gradient for the curve becomes as $(K_{EO} \cdot e - K_F f)K_T/(1 + KOKVKe)$.

In case, the negative feedback which allows the output −KO of the direct current detector 13 to become zero is not present, the tracking servo unbalance becomes a great value such as $K_{EO} \cdot e - K_F f$ but, the more increase in the output −KO, i.e., more the negative feedback being fed, the more the unbalance is gradually decreased, and the gain rate KO of direct current detector 13 is determined under the allowable value of tracking servo unbalance.

Figure 7:
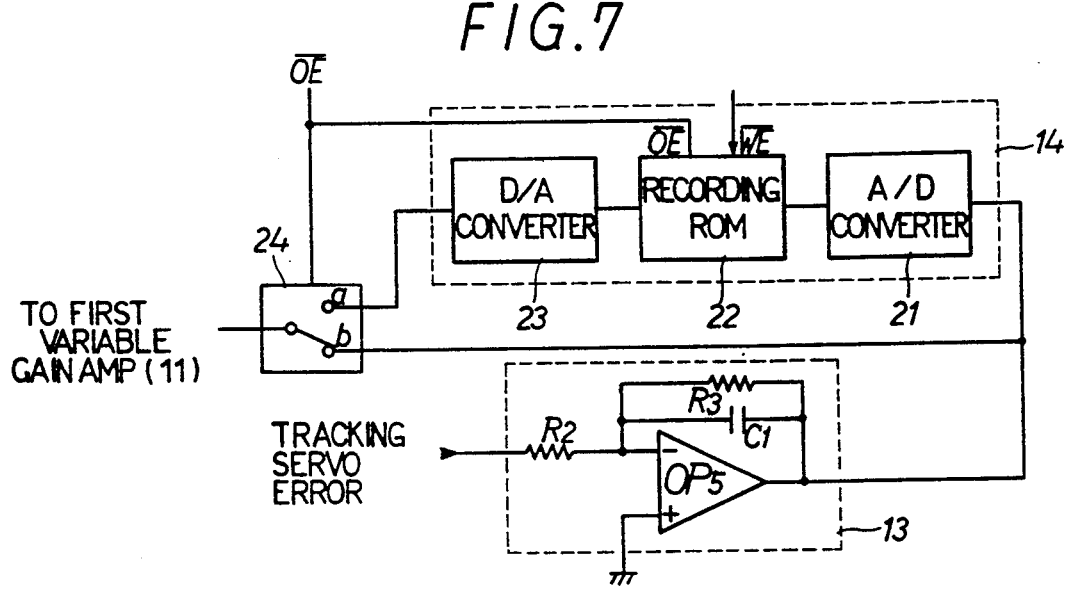
FIG. 7 is a detailed block diagram of FIG. 4.

FIG. 7 is a block diagram for illustrating in more detail a preferred embodiment with regard to an automatic control system for the tracking servo unbalance of optical disc player of the present invention. As shown in FIG. 7, the direct current detector 13 is constituted such a manner that the output side of the differential amplifier OP4 is connected to an inverse input terminal of operational amplifier OP5 through a resistor R2, and also to its output terminal through a resistor R3 and a capacitor C1 connected in parallel, thereby rendering the gain rate −KO to become −R3/R2; digital storing means 14 is comprised of A/D converter 21 for converting the output voltage of the direct current detector 13, a Recording ROM 22 for storing the output signal of the A/D converter 21 in response to write enable signal $\overline{WE}$ and then outputting said stored signal by output enable signal $\overline{OE}$, and a D/A converter 23 for converting the output signal of the Recording ROM 22 into an analog signal; and an analog switch 24 is constituted such a manner that one of the output signals of the direct current converter 13 and digital storing means 14 is selected according as whether or not the output enable signal $\overline{OE}$ is applied so as to apply it to a control terminal of first variable gain amplifier 11.

According to the present invention, the tracking servo error outputted from the differential amplifier OP4 is detected as direct current voltage by the gain rate KO=R3/R2 at the direct current detector 13, and said direct current voltage is converted into digital signal at the A/D converter 21. Accordingly, in case where the low potential write enable signal $\overline{WE}$ is applied, digital signal which is the output signal of the A/D converter 21 is stored in the Recording ROM 22. Thereafter, in case where the low potential output enable signal $\overline{OE}$ is applied, the digital signal stored in the Recording ROM 22 is outputted, and this digital signal is converted into analog signal at D/A converter 23 whereby being applied to the fixed terminal a of the analog switch 24. Wherein, since the analog switch 24 is short-circuited to its fixed terminal a by the low potential output enable signal $\overline{OE}$, the output signal of the D/A converter 23 is applied to the first variable gain amplifier 11 as a gain control voltage through the analog switch 24. On the other hand, in a state that the low potential output enable signal $\overline{OE}$ is not applied, since the analog switch 24 is short-circuited to its fixed terminal b, the output voltage of the direct current detector 13 is applied to the first variable gain amplifier 11 as a gain control voltage through said analog switch 24.

Figure 8:
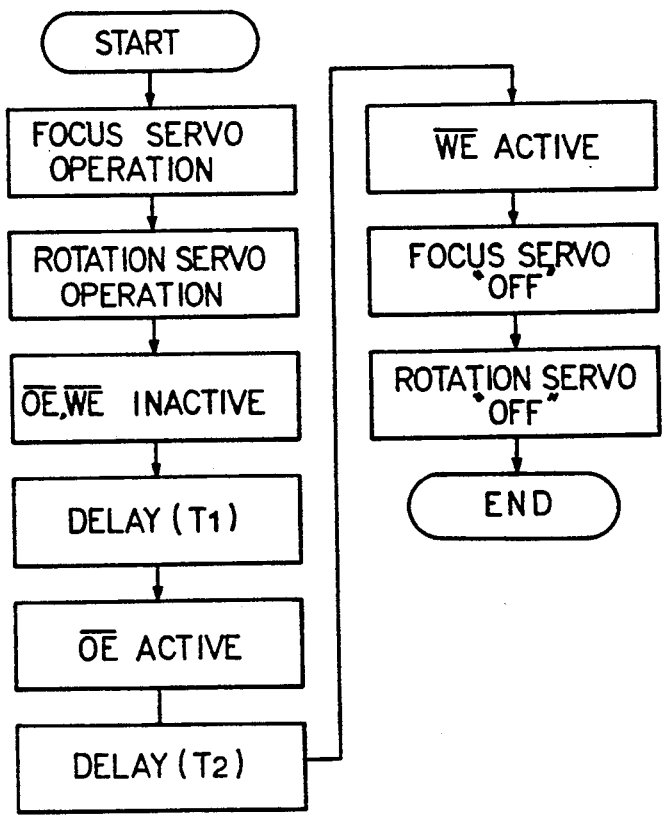
FIG. 8 is a flow chart with regard to the adjusting process of automatic control system for a tracking servo unbalance of optical disc player of the present invention.

FIG. 8 is a flow chart for illustrating the control process of automatic control system for the tracking servo unbalance of optical disc player of the present invention. As shown in FIG. 8, a focusing servo for focusing the laser beam on the disc is operated and then a servo for turning the disc with a constant speed is operated whereby the disc is turned, and the output enable signal is made to inactive whereby the analog switch 24 is connected to the terminal b so as to receive the output of direct current detector 13 and then the write enable signal $\overline{OE}$ is made to inactive whereby stopping the storing function of the Recording ROM 22.

This is the state that negative feedback for eliminating the tracking servo unbalance is operated, wherein a predetermined time period T1 for reaching a desired state elapses.

And thereafter, the output enable signal $\overline{OE}$ is made to active whereby the negative feedback is rendered to feed through the digital storing means 14. Accordingly, the error between both parties produced through D/A converter 21 and A/D converter 23 is decreased within a negative feedback loop. In such a state, waiting a predetermined time period T2 for passing the intermediate process and then rendering the write enable signal $\overline{WE}$ to be active thereby storing the output of the direct current detector 13 passed through the A/D converter 21.

Thus, the value stored in the digital storing means 14 eliminates the tracking servo unbalance through the D/A converter 23 at any time whenever the power is turned on again for normal play.

And next, since the adjustment is finished, the focus cuts off, the turning of disc stops, and then the whole adjustment is completed.

As described above in detail, according to the present invention, in case of manufacturing a product related to compact disc, the tracking servo unbalance is automatically eliminated, and the direct current detector and digital storing means can be integrated, and therefore there is effect that cost saving and reliability can be obtained.

What is claimed is:

1. An automatic control system for a tracking servo unbalance of optical disc player comprising:

first and second variable gain amplifiers for converting output current of first and second photodetectors into a voltage;

a differential amplifier for differentially amplifying output voltage of said first and second variable gain amplifiers and for outputting a differential output signal as a tracking servo error;

a direct current detector for detecting a direct current of said tracking servo error outputted from said differential amplifier;

digital storing means for converting an output signal of said direct current detector into a digital signal, for storing said digital signal in response to a write enable signal, for reading the stored digital signal in response to an output enable signal, for converting the read digital signal into an analog signal, and for outputting said analog signal; and an analog switch for selecting either said analog signal of said digital storing means or an output signal from said direct current detector in response to said output enable signal, thereby applying the selected signal as a gain control voltage to said first variable gain amplifier.

2. The automatic control system as claimed in claim 1, wherein said differential amplifier is an operational amplifier with an inverse input terminal of said operational amplifier being connected to an output terminal of said operational amplifier through a resistor and capacitor connected in parallel.

3. The automatic control system as claimed in claim 1, wherein said digital storing means comprises:

an A/D converter for converting the output voltage of said direct current detector into a digital signal;

a Recording ROM for storing an output signal of said A/D converter in response to said write enable signal; and an A/D converter for converting the output signal of said Recording ROM into an analog signal.

* * * * *